J. R. TANNER.
FLANGE FOR TUBES.
APPLICATION FILED FEB. 24, 1908. RENEWED FEB. 5, 1909.
918,926.
Patented Apr. 20, 1909.
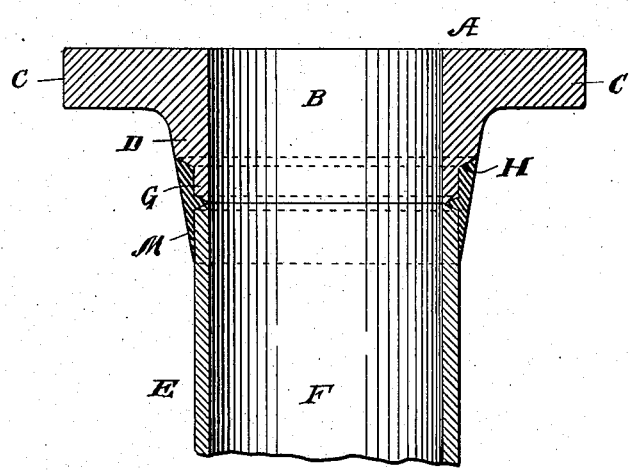
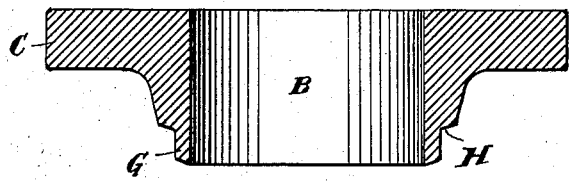
WITNESSES:
INVENTOR
J. R. Tanner
by F. N. Barker
ATTORNEY

UNITED STATES PATENT OFFICE.

JULIUS R. TANNER, OF PITTSBURG, PENNSYLVANIA, ASSIGNOR TO THE PITTSBURGH VALVE, FOUNDRY & CONSTRUCTION COMPANY, OF PITTSBURG, PENNSYLVANIA, A CORPORATION OF PENNSYLVANIA.

FLANGE FOR TUBES.

No. 918,926.     Specification of Letters Patent.     Patented April 20, 1909.

Application filed February 24, 1908, Serial No. 417,259. Renewed February 5, 1909. Serial No. 476,316.

*To all whom it may concern:*

Be it known that I, JULIUS R. TANNER, a citizen of the United States, residing at Pittsburg, in the county of Allegheny and State of Pennsylvania, have invented or discovered new and useful Improvements in Flanges for Tubes, of which the following is a specification.

My invention relates to flanges intended for welding to the ends of tubes.

The object of my invention is to provide a flange which may be welded to a tube by the blow-pipe process and which will allow the abutting or contiguous ends of the flange and tube to be equally heated, so that the weld will be perfect and the end of the tube will not be burned.

Referring to the drawing accompanying this specification, the figure thereon shows in longitudinal section a tube welded to the preferred form of flange constituting my invention.

A represents my improved flange as a whole. It has the axial opening B and the flange member C extending at a right angle thereto. It also has the flange member D extending at a right angle to the member C and is really a tubular extension beyond one face of the member C, the opening therein being a continuation or a part of the said opening B. Where the member C meets the member D, the latter member is reinforced by making the wall thereof gradually thicker from the outer end of the member D toward the member C, as shown clearly on the drawing.

E is a tube having its axial opening F of the same diameter as the opening B and in line therewith, the ends of the tube and the member D of the flange A preferably abutting so as to form a butt-weld joint when the welding has been completed. The wall of the tube E is thinner than the end of the member D would have been if the same had not been reduced as shown at G, the said reduced end of the member D forming the exterior shoulder H at its juncture with the normal wall of the said member. The portion G has its wall substantially of the same thickness as the wall of the tube E. Preferably the contiguous ends of the tube and member D are beveled so as to form at their juncture a V-shaped annular groove K.

A blow-pipe flame is directed against the walls of the V-shaped groove and along the reduced portion G and the shoulder H of the member D and along a portion of the tube E adjacent to the joint. As soon as the metal along the said heated portions becomes sufficiently fused to make a good weld, metal is introduced into the flame, the molten metal drooping upon the said heated portions and filling the space between the shoulder H and the outer limit of the heated portion of the tube E, as shown by the letter M. If the member D had continued on to the end of the same without the reduction thereof to the thickness of the tube E, the member D being thicker then the tube end would have conducted more heat of the blow-pipe away from the joint than the thinner end of the tube E would have conducted. The result would be that the tube end would become burned before the end of the member D would be hot enough to make a proper weld. This has been the defect in welding rings to the exterior of tubes, as the thick wide ring draws off so much heat from the joint that the tube is heated too hot or burned before the ring has become sufficiently hot.

With the flange shown and described, the reduced portion G being of the same thickness as the tube E, or somewhat thinner than the same does not conduct appreciably more heat from the joint than the tube itself. The reduced portion G is made sufficiently long or thin, or both, to make the conduction away from the joint substantially equal or the difference so slight as to be negligible.

I claim—

1. In a welded joint, a metal tube, a metal flange having a flange member at an angle to the axis of said flange and a second flange member parallel to the axis of said flange and having its end abutting the end of said tube, said second member having the end contiguous to the end of the tube reduced substantially to the thickness of the tube, and a welding material covering and welded to the adjacent ends of the tube and the second member.

2. The process of welding together the ends of two tubular bodies having walls of different thicknesses, which consists in reducing the thickness of the wall of the thicker tube at the end to be welded, then placing the reduced end of said thicker tube in contact with the end of the other tube, and then fusing the metal adjacent to the joint, and supplying fused metal to cover the said joint.

Signed at Pittsburg, Pa., this 20th day of February, 1908.

JULIUS R. TANNER.

Witnesses:
F. N. BARBER,
M. A. BARTH.